(12) United States Patent
Nardi et al.

(10) Patent No.: US 7,991,529 B2
(45) Date of Patent: Aug. 2, 2011

(54) METHOD AND SYSTEM FOR DETECTING A VIBRATION LEVEL OF A WHEEL WITHIN A RESONATING FREQUENCY RANGE OF A VEHICLE SUSPENSION

(75) Inventors: Flavio Nardi, Farmington Hills, MI (US); Nikolai K. Moshchuk, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 624 days.

(21) Appl. No.: 12/144,027

(22) Filed: Jun. 23, 2008

(65) Prior Publication Data
US 2009/0319123 A1    Dec. 24, 2009

(51) Int. Cl.
*B60G 17/016* (2006.01)
(52) U.S. Cl. ............................................. 701/38; 701/36
(58) Field of Classification Search .................... 701/36, 701/37, 38
See application file for complete search history.

(56) References Cited

U.S. PATENT DOCUMENTS

| | | | |
|---|---|---|---|
| 4,634,142 A | 1/1987 | Woods et al. | |
| 5,101,355 A * | 3/1992 | Wada et al. | 701/37 |
| 5,123,671 A | 6/1992 | Driessen et al. | |
| 5,497,324 A | 3/1996 | Henry et al. | |
| 5,642,899 A | 7/1997 | Inoue et al. | |
| 5,753,890 A * | 5/1998 | Nevin | 219/219 |
| 5,846,157 A | 12/1998 | Reinke et al. | |
| 6,161,844 A | 12/2000 | Charaudeau et al. | |
| 6,202,011 B1 | 3/2001 | Jeon | |
| 6,314,342 B1 | 11/2001 | Kramer et al. | |
| 6,366,841 B1 * | 4/2002 | Ohsaku | 701/37 |
| 6,434,460 B1 | 8/2002 | Uchino et al. | |
| 6,633,803 B1 | 10/2003 | Shal et al. | |
| 7,076,351 B2 | 7/2006 | Hamilton et al. | |
| 7,132,937 B2 | 11/2006 | Lu et al. | |
| 7,269,485 B2 * | 9/2007 | Oikawa et al. | 701/1 |
| 7,406,371 B2 * | 7/2008 | Izawa et al. | 701/37 |
| 7,900,938 B2 * | 3/2011 | Sano | 280/5.502 |
| 2002/0097180 A1 | 7/2002 | Geisheimer et al. | |
| 2005/0206099 A1 | 9/2005 | Song | |
| 2006/0217859 A1 | 9/2006 | Barta | |
| 2007/0067080 A1 | 3/2007 | Messih et al. | |
| 2010/0013174 A1 * | 1/2010 | Buma et al. | 280/5.507 |
| 2010/0145574 A1 * | 6/2010 | Mattson et al. | 701/38 |

FOREIGN PATENT DOCUMENTS

| | | | |
|---|---|---|---|
| JP | 2006524798 A | 11/2006 | |
| JP | 2007297043 A | 11/2007 | |
| WO | WO-9219948 A1 | 11/1992 | |
| WO | WO-0108908 A1 | 2/2001 | |

* cited by examiner

*Primary Examiner* — Toan C To

(57) ABSTRACT

A method that detects whether the vibration level of the wheel is within the resonating frequency range by utilizing discrete velocity measurements. The method includes continuously measuring velocity levels of a wheel relative to a sprung mass vehicle component. These measurements are continuously recorded over a period of time. A periodic algorithm is provided, and the periodic algorithm and the velocity measurements are utilized to determine an output value. The output value is utilized to determine whether the vibration level of the wheel is within the resonating frequency range.

20 Claims, 4 Drawing Sheets

METHOD AND SYSTEM FOR DETECTING A VIBRATION LEVEL OF A WHEEL WITHIN A RESONATING FREQUENCY RANGE OF A VEHICLE SUSPENSION

TECHNICAL FIELD

This disclosure is related to vehicle suspensions and suspension control systems.

BACKGROUND

Vehicle suspensions generally assist in maintaining ride conditions that are acceptable to vehicle passengers. In particular, suspensions isolate the vehicle passengers from large vertical accelerations including those caused by bumps and other road disturbances.

Know vehicle suspensions generally include shock absorbers, springs, housing components, and various connecting components. Modern vehicle suspensions, such as semi-active or active suspensions, further include a control system wherein various sensors located throughout the vehicle measure motion of vehicle components including wheel motion and wherein a controller utilizes the motion measurements to control the action of suspension components. In one type of semi-active suspension, the controller sends signals changing damping levels of hydraulic shock absorbers of the suspension in response to signals from sensors located proximate each wheel.

When a wheel begins to vibrate at a frequency near a natural resonance frequency of the suspension—known as a wheel hop frequency—the vibrations are amplified. One type of suspension system has a single damping strategy for both low frequency vibrations and high frequency vibrations. The single strategy provides some damping level to the suspension under both high and low frequency conditions. However, neither damping level is specifically tuned to control vibrations in a specific frequency range.

Another type of suspension system has a controller that controls a condition where a chatter bump frequency (that is, the frequency of relative vertical movement between sprung and unsprung vehicle components in response to bumps of the road surface) is close to the vehicle's wheel hop frequency. These systems detect the situations in which the chatter bump frequency is close to the wheel hop frequency by using filters such as bandpass filters or a combination of low and high pass filters. However, systems having bandpass or low and high pass filters assume a preprogrammed wheel hop frequency and, therefore, do not automatically adapt to changes in the vehicle such as vehicle customizations and changes in vehicle component properties over time.

SUMMARY

A method of detecting a vibration level of a wheel within a resonating frequency range of a vehicle suspension includes determining velocities of the wheel relative to a sprung mass of said vehicle and recording velocities over a selected time period. At least one periodic algorithm is provided for determining an output value based on the recorded velocities over the selected time period. The vibration level of the wheel is determined within the resonating frequency range by utilizing the output value.

BRIEF DESCRIPTION OF THE DRAWINGS

One or more embodiments will now be described, by way of example, with reference to the accompanying drawings, in which.

DETAILED DESCRIPTION

Figure 1:
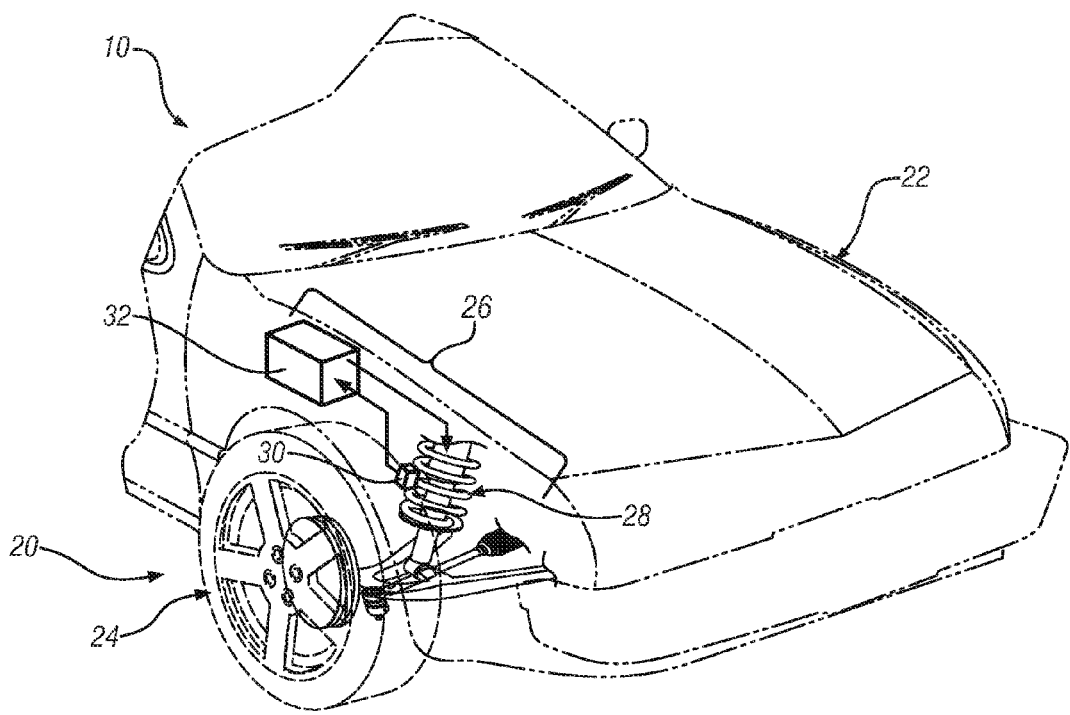
FIG. 1 depicts a vehicle including a control system for detecting a vibration level of the wheel within a resonating frequency range in accordance with an exemplary embodiment of the present disclosure.
Figure 2:
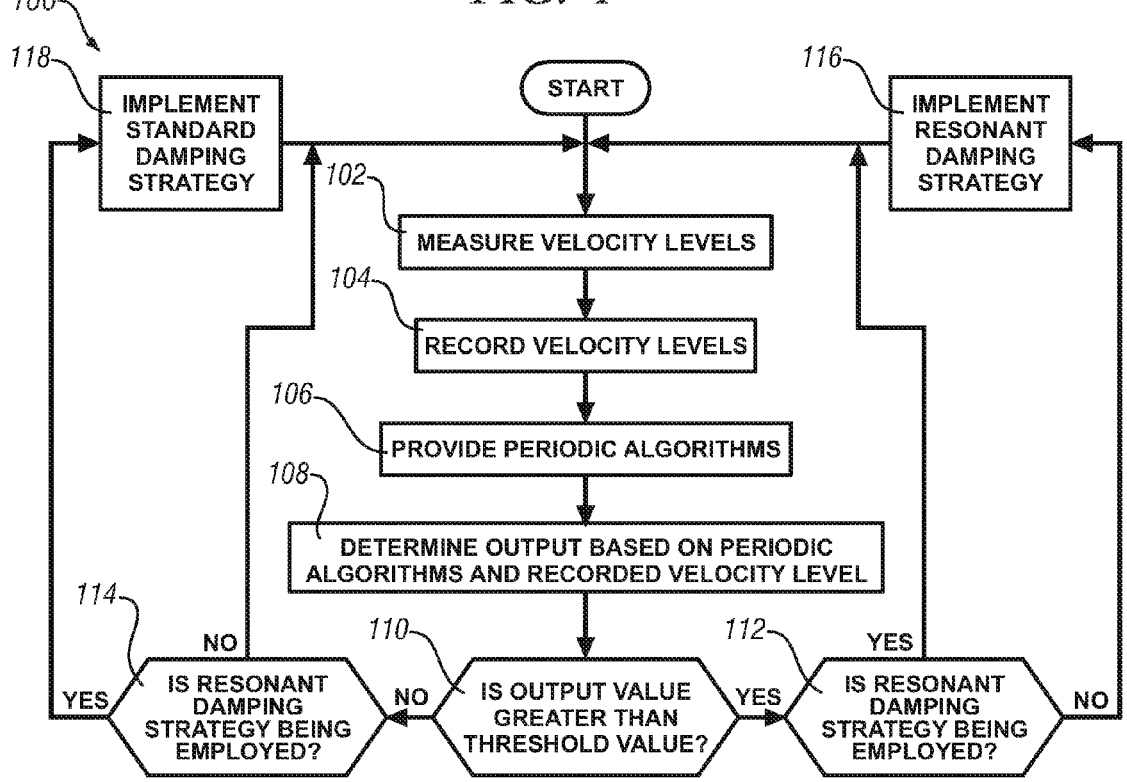
FIG. 2 depicts a method of detecting a vibration level of a wheel within a resonating frequency range in accordance with an exemplary embodiment of the present disclosure.

Referring now to the drawings, wherein the showings are for the purpose of illustrating certain exemplary embodiments only and not for the purpose of limiting the same, FIG. 1 and FIG. 2, show a vehicle 10 and a method 100 of detecting a vibration level within a resonating frequency range of the vehicle 10.

It should be noted that the vehicle 10 and the method 100 are intended only as exemplary embodiments and numerous changes could be made without deviating from the scope of the disclosure.

The method 100 detects vibration levels of the vehicle. In particular, the method detects the frequency at which the wheel is oscillating in a generally vertical direction (that is, generally perpendicular to the surface over which the vehicle is traveling). A common cause of wheel vibrations is a vehicle traveling over a surface having several small but abrupt changes in height, for example, a road with a rough surface, also known to those having ordinary skill in the art as chatter bumps. Vibrations caused by vehicles traveling over these types of surfaces typically last for a duration of a 100 milliseconds to several seconds. Another common cause of vehicle vibrations is a vehicle traveling over a large change in surface height, for example a vehicle traveling over a curb or a pothole. Vibrations caused by vehicles traveling over these types of surfaces are commonly known as isolated inputs and tend to last only about 20 milliseconds. The method 100 can distinguish between vibrations caused by chatter bumps and vibrations caused by isolated inputs.

Also, the method 100 detects vibration levels of the wheel within the resonating frequency range of the vehicle suspension. The resonating frequency range is a range of frequencies in the neighborhood of the natural resonant frequency of the suspension system. The natural resonant frequency is a frequency at which the wheel will vibrate at maximum amplitude for a given input energy. Therefore, the resonating frequency range is a range of frequencies in which the wheel will have a low resistance to vibrations and therefore the wheel will oscillate at high amplitude levels.

Typically, the natural frequency of the vehicle suspension is between about 10 Hz and about 16 Hz, for example 12.5 Hz. However, the wheel begins to amplify the road input when the wheel experiences vibration levels within the wheel's resonating frequency range, that is, a range that encompasses the wheel's natural frequency, for example from about 10 Hz to about 16 Hz.

As described in further detail herein below, the method 100 utilizes discrete velocity measurements to detect the vibration level of the wheel within the resonating frequency range. By utilizing discrete velocity measurements, the method 100 can detect vibration levels within the resonating frequency range without using bandpass, lowpass, and highpass filters.

Referring to FIG. 1, the vehicle 10 includes an unsprung mass 20, a sprung mass 22, and a suspension control system 26. FIG. 1 is exemplary of a single corner of a vehicle wherein the unsprung mass 20 includes unsprung mass components such as a wheel 24, axles (not separately shown), and other suspension system 28 components. In alternate exemplary embodiments, the unsprung mass can include a suspension system along with any wheels, axles, or tracks that may present in a vehicle.

The sprung mass 22 is the mass of the vehicle supported by the suspension. The sprung mass 22 includes various sprung mass components including vehicle components other than the suspension system, the wheels, and the axles. In particular, the sprung mass components include the frame, engine, interior components and like components.

The suspension control system 26 is provided to dampen vibrations transferred to the sprung mass components. The suspension control system includes the suspension system 28, a sensor 30, and a controller 32.

The suspension system 28 includes springs, semi-active hydraulic shock absorbers, housing components, and various connecting components. The springs absorb forces thereby lessening vibrational forces transferred to the sprung mass components of the vehicle.

The semi-active hydraulic shock absorbers dampen or control the motion of the springs. Hydraulic shock absorbers use shock absorbing fluid to dampen vibrations. The semi-active shock absorbers are configured to change the damping level of the suspension thereby changing a vehicle damping level in response to signals from the controller.

The semi-active hydraulic shock absorbers of the suspension system 28 transition between operating positions in response from signals from the controller 32. In particular, the semi-active hydraulic shock absorbers can operate in a first operating position or a second operating position. In the first operating mode, the shock absorbers are relatively soft to compression (allowing a soft response to a bump) and relatively hard to extension under standard operating conditions. The second operating mode provides compression and extension damping levels that will dampen vehicle vibrations within the resonating frequency range.

In alternate exemplary embodiments, other types of shock absorbers can be used. For example, various other types of semi-active hydraulic shock absorbers, active hydraulic shock absorbers, and shock absorbers having magneto-rheological dampers, which change the damping level by use of electromagnets, can be used.

The sensor 30 is provided to detect the position of the wheel 24 relative to the sprung mass 22, preferably the frame or structure of the vehicle. In particular, sensor 30 is a suspension deflection sensor. In one embodiment, the suspension deflection sensor 30 includes a rotary resistive device mounted to the sprung mass and an arm member pivotally coupled between the vehicle wheel and the rotary resistive device. The suspension deflection sensor allows the rotary resistive device to provide an impedance output that varies with the angle of the arm member relative to the rotary resistive device. Therefore, the impedance output is proportional to the relative vertical position between the wheel 24 and the frame.

In alternative exemplary embodiments, sensors can further include buffering and velocity calculating capabilities wherein the sensor outputs signals indicative of relative vertical velocity rather than relative vertical position. Further, the sensor can directly measure velocity rather than measuring position by utilizing, for example, wave distortion principles. Still further, other types of sensor such as other contacting position sensors, other non-contacting position sensors, piezoelectric position sensors, rotary encoders, and the like can be utilized to measure the relative vertical position or velocity of a wheel to a sprung mass.

The controller 32 includes a microcomputer and a data storage device. The microcomputer is configured to receive signals from the sensor, to perform calculations utilizing the sensor signals and to send signals to the shock absorbers. The data storage device is configured to store velocity measurements. In alternate exemplary embodiments, the controller can include multiple microcomputers located in various parts of the vehicle communicating with each other through communications busses or by wireless communications.

The vehicle 10 includes other wheels, each having a sensor and suspension system components operating substantially similar to the wheel 24, the sensor 30, and the semi-active shock absorbers and springs described above. Each of the other sensors send output signals indicative of the position of the wheels relative to the sprung vehicle components to the controller, and the controller utilizes these signals to determine a damping control strategy to dampen vibrations from each of the wheels.

Referring to FIG. 2, the method 100 is now described with reference to vehicle 10 traveling over a surface as the vehicle wheels move toward the frame (compression) or away from the frame (rebound). In particular, exemplary method 100 detects a vibration level of a vehicle within a resonating frequency range of about 10 Hz to about 15 Hz. This resonating frequency range assumes a central resonating frequency of substantially 12.5 Hz. The central resonating frequency corresponds to a natural resonance frequency of the suspension system. Preferably, a resonating frequency range in accordance with the disclosure includes such a natural resonance frequency and frequencies within, for example, an envelope of substantially +/−30% of the natural resonance frequency. One having ordinary skill in the art will recognize that alternate embodiments can be utilized to measure various other frequency ranges without deviating from the scope of the disclosure.

At step 102, the sensor 30 measures velocity levels of the wheel 24 relative to the vehicle frame. In particular, the exemplary rotary resistive sensor 30 continuously measures discrete impedance levels indicative of vehicle wheel position relative to the frame at fixed time intervals of one millisecond. The sensor then sends output signals (P) indicative of position levels to the controller 32, which are converted to velocity levels as described below. In alternate embodiments, the sensor directly measures velocity levels of other sprung mass vehicle components relative to other unsprung mass vehicle components.

The controller 32 calculates vertical velocity ($\dot{z}$) by dividing the difference between each two consecutive position measurements and the discrete time period between which the position measurements were taken. For example, for a first velocity measurement $\dot{z}_1$ and a second velocity measurement $\dot{z}_2$:

$$\dot{z}_1 = (P_2 - P_1)/t, \text{ and}$$

$$\dot{z}_2 = (P_3 - P_2)/t.$$

The time period over which each position measurement is taken is one millisecond, but in alternate embodiments, the time period can be selected based on the accuracy level of the sensor and a desired accuracy level of the velocity calculation. Alternatively, a smooth derivative filter can be implemented for the calculation of the velocity signal from the discrete position measurements.

At step 104, the storage device stores the velocity levels measured at step 102 over a period of time. In particular, 200 velocity measurements are buffered in the storage device over a selected time period. The number of buffered velocity measurements is selected to correspond with a selected time period that is at least double the longest wave period to be captured. In method 100, the longest wave period is the wave period associated with a wave having a frequency of 10 Hz, which corresponds to a wave period of 100 milliseconds. Thus, the storage device buffers 200 velocity measurements to achieve data over a time period that is double the longest wave period or 200 milliseconds (that is, 200 times 1 millisecond). In alternate exemplary embodiments, other levels of velocity measurements can be buffered depending on the time period over which the measurements are taken and the desired maximum period of the frequency that is being detected. In one alternate exemplary embodiment, 100 velocity measurements are buffered and utilized in subsequent estimation calculations. In one alternate exemplary embodiment 1,000 velocity level measurements are buffered and utilized in subsequent estimation calculations. In one alternate exemplary embodiment, the storage device buffers velocity measurements to store data over a time period of 100 milliseconds. In one alternate exemplary embodiment, the storage device buffers velocity measurements to store data over a time period of 500 milliseconds.

In an alternate exemplary embodiment, the velocity levels can be recorded as data that can be converted to velocity levels through processing or calculation. For example, the velocity levels can be recorded as a series of relative positions and associated time periods, and then can be converted to velocity levels.

At step 106, the controller provides three periodic algorithms by accessing a stored program. In particular, the controller provides three Fourier series approximation algorithms of a wheel vertical velocity signal $\dot{z}_{damper}$ indicated in Equations (1), (2), and (3) below:

$$\dot{z}_{damper} = a_{\omega_1}\sin(\omega_1 t) + b_{\omega_1}\cos(\omega_1 t), \quad (1)$$

$$\dot{z}_{damper} = a_{\omega_2}\sin(\omega_2 t) + b_{\omega_2}\cos(\omega_2 t), \quad (2)$$

$$\dot{z}_{damper} = a_{\omega_3}\sin(\omega_3 t) + b_{\omega_3}\cos(\omega_3 t), \quad (3)$$

where $\omega_1$, $\omega_2$, $\omega_3$, are each an input frequency selected by the controller and the Fourier coefficients, for example $a_{\omega_1}$ and $b_{\omega_1}$ of FIG. 1 can be calculated by Equations (4), (5), and (6) below:

$$a_{\omega_1} = \frac{2}{T}\int_{t_1}^{t_2} \dot{z}_{damper}\sin(\omega_1 t)dt \quad (4)$$

$$b_{\omega_1} = \frac{2}{T}\int_{t_1}^{t_2} \dot{z}_{damper}\cos(\omega_1 t)dt \quad (5)$$

where, $T=t_2-t_1=$ the selected time period at which measurements are recorded.

Values for $a_{\omega_2}$, $b_{\omega_2}$, $a_{\omega_3}$, $b_{\omega_3}$ can be calculated by substitution of the coefficients and their respective frequencies in the equations (4) and (5) above.

At step 108, the controller determines an output based on the periodic algorithms and the recorded velocity level. In particular, the controller calculates a summation of the buffered velocity levels at the discrete time periods and at predetermined frequency levels to solve for all coefficients $a_{\omega_1}$, $b_{\omega_1}$, $a_{\omega_2}$, $b_{\omega_2}$, $a_{\omega_3}$, and $b_{\omega_3}$.

The discrete time implementation replaces the integrals of Equations (4) and (5) with a summation. Values of a and b are solved for selected frequency levels of: $\omega_1=10$ Hz, $\omega_2=12.5$ Hz, and $\omega_3=15$ Hz. To determine a and b at the frequency of 10 Hz the damper signal, $\dot{z}_{damper}$, is buffered with N points and the summations shown below in Equation (6) and Equation (7) are used:

$$a_{\omega_1} = \frac{2}{N}\sum_{j=0}^{N-1} \dot{z}_{damper}(t - j\Delta t)\sin(2\pi\omega_1 j\Delta t) \quad (6)$$

$$b_{\omega_1} = \frac{2}{N}\sum_{j=0}^{N-1} \dot{z}_{damper}(t - j\Delta t)\cos(2\pi\omega_1 j\Delta t) \quad (7)$$

The controller then determines an amplitude, $|\dot{z}_{damper}|_{\omega_1=10\,hz}$, of the Fourier approximation by using Equation (8) below:

$$|\dot{z}_{damper}|_{\omega_1} = \sqrt{a_{\omega_1}^2 + b_{\omega_1}^2} \quad (8)$$

The amplitude of the Fourier approximation is significant when the damper velocity signal is rich at the specific frequency $\omega_1$.

Figure 3:
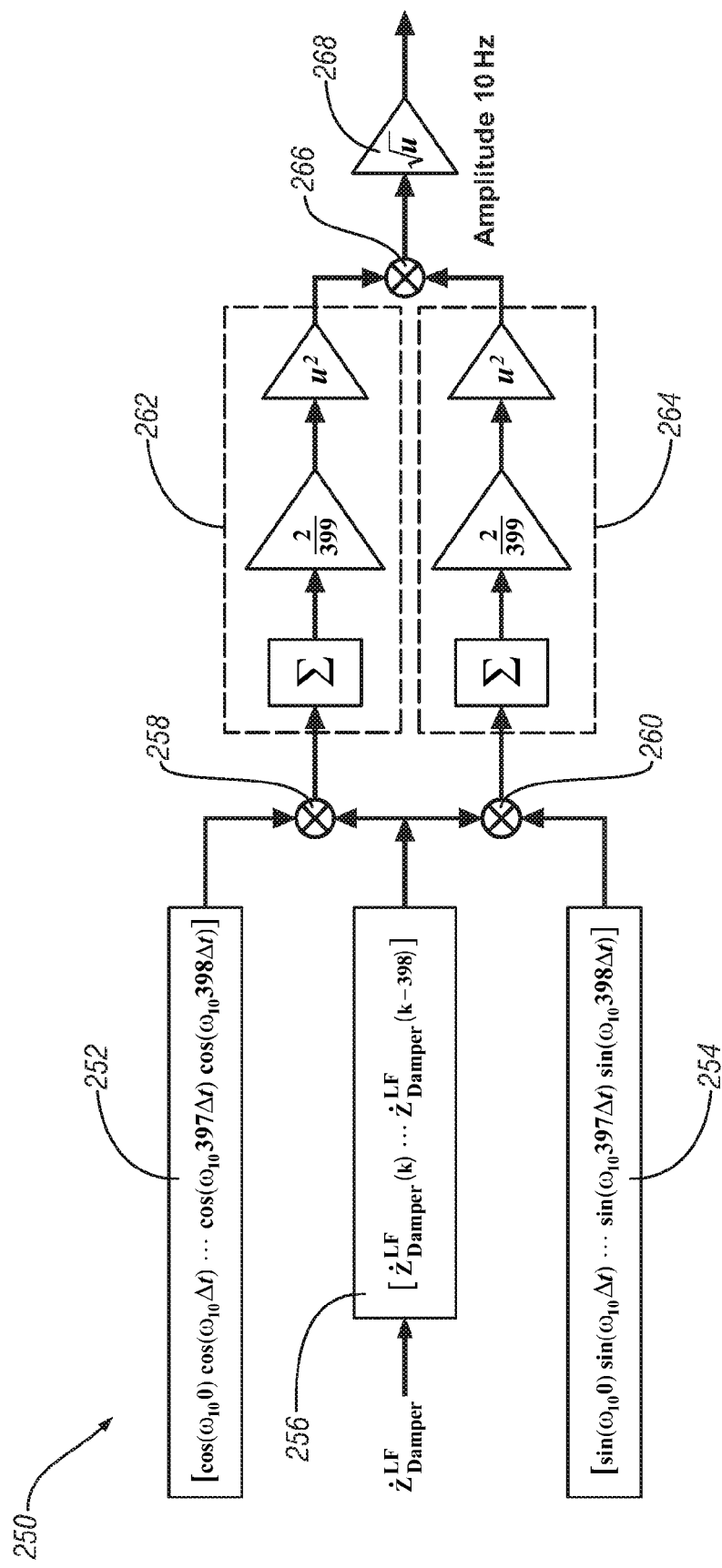
FIG. 3 depicts a block diagram of a frequency detection algorithm used in the method of FIG. 2.

Referring to FIG. 3, a block diagram 250 represents the actual discrete time wheel hop detection algorithm for the 10 Hz frequency case ($\omega_{10}=10\times 2\times \pi$). The block diagram includes blocks 252, 254, 256, 262, and 264, 268 and junctions 258, 260, and 266.

In block 252, the controller provides the summation equation of Equation (7) used to estimate the solution for coefficient b of the periodic equation. In block 254, the controller provides the summation equation of Equation (6) used to estimate the solution for coefficient a of the periodic equation. In block 256, the controller provides the discrete velocity measurements of the wheel relative to the sprung mass.

At junction 258, the controller inputs the velocity measurements of block 256 into the summation equation of block 252. At junction 260, the controller inputs the velocity measurements of block 256 into the summation equation of block 254.

In block 262, the controller solves for the summation equation with the velocity measurements inputted to determine a value for coefficient b. In block 264, the controller solves for the summation equation with the velocity measurements inputted to determine a value for coefficient a.

At junction 266 the controller combines the calculated values for coefficients a and b. In block 268, a root mean square of the coefficients is determined to get an amplitude at frequency $\omega_{10}$.

Since the natural frequency of the vehicle's suspension can vary, the controller damper velocity signal is calculated at three different frequencies: 10 Hz, 12.5 Hz, and 15 Hz. The approximations are then summed and normalized as shown in Equation (9) below:

$$RFDA = |\dot{z}_{damper}|_{\omega_1=10\,hz} + |\dot{z}_{damper}|_{\omega_2=12.5\,hz} + |\dot{z}_{damper}|_{\omega_3=15\,hz} \quad (9)$$

wherein RFDA is the resonating frequency detection amplitude. The resonating frequency detection amplitude is the amplitude the controller calculates to determine whether the input wheel frequency is within the resonating frequency range.

The Fourier series approximation provides an uncomplicated approximation in that the approximation can be made on the basis of either one or both of the coefficients a and b.

However, in alternate embodiments, a method can determine whether vibration levels of a wheel are within the resonating range of a vehicle suspension by inputting discrete velocity level measurements into other types of periodic functions. For example, in other exemplary embodiments, Complex Fourier Transforms and Laplace Transforms can be used.

Referring again to FIG. 2, at step, 110 the controller determines whether the output value, RFDA, determine by the controlleris greater than a threshold value. If the output value is greater than the threshold value, then the controller proceeds to step 112. If the output value is less than the threshold value, then the controller proceeds to step 114.

In both step 112 and step 114, the controller determines whether a resonant or a standard control strategy is being implemented. The resonant control strategy dampens vehicle vibrations within the resonating frequency range. The standard control strategy dampens vehicle vibrations under standard vehicle operating conditions.

If the resonating frequency detection amplitude is high (that is, if the normalized resonating frequency is close to one), the suspension's vibration level is very near the natural resonance frequency. If the resonating frequency detection amplitude frequency is above the threshold amplitude, the suspension vibration level is within the resonating frequency range.

Figure 4:
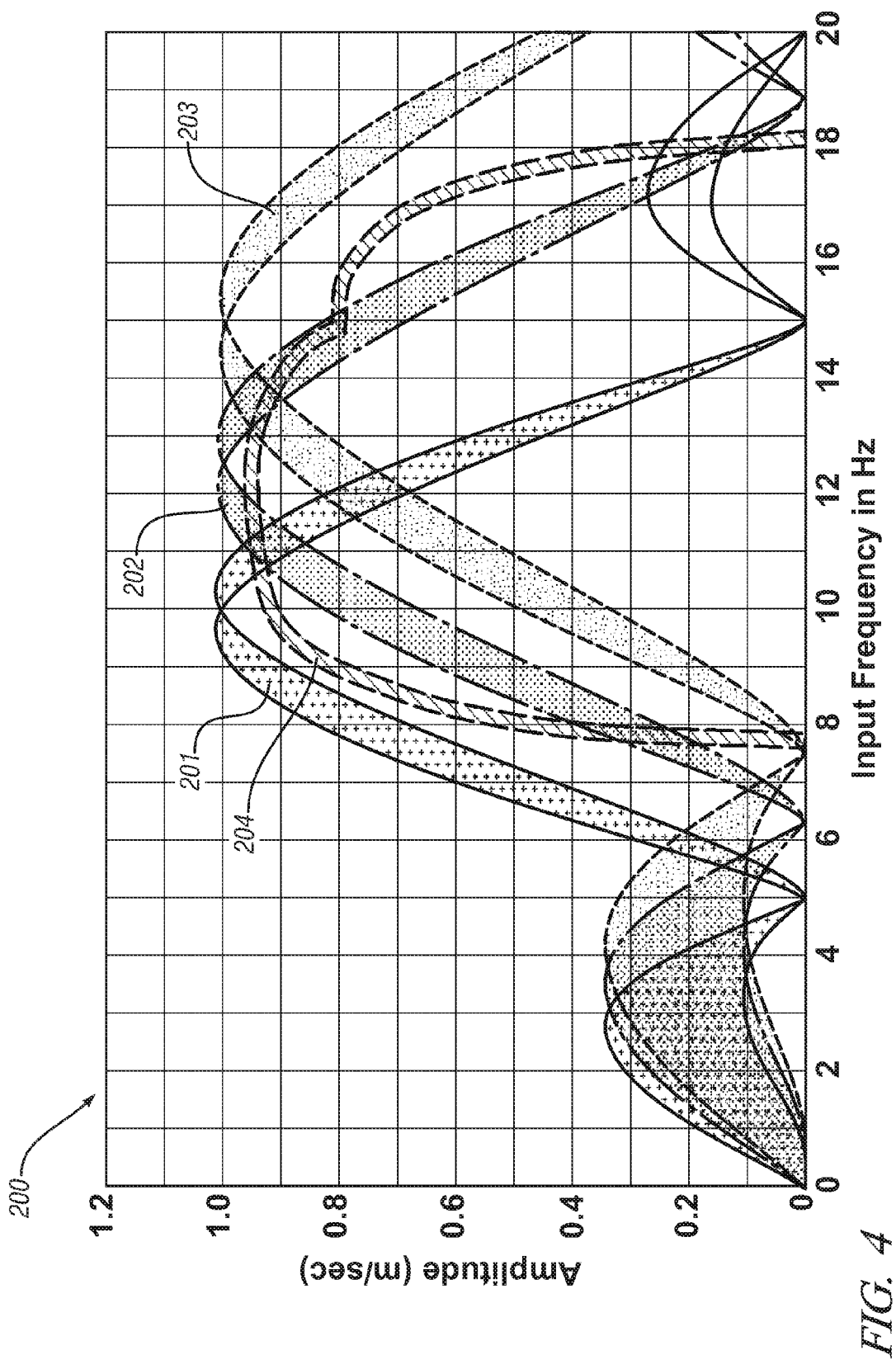
FIG. 4 is a plot of four output values determined using the method of FIG. 2, versus input vibrational frequencies.

Referring to FIG. 4, a chart 200 shows a plot 201, a plot 202, a plot 203, and a plot 204. The x-axis of the chart displays input frequencies. The y axis displays the normalized $|\dot{z}_{damper}|_\omega$ amplitude as determined from the Fourier approximation calculation.

Plot 201 shows the normalized amplitude estimate calculation at 10 Hz ($|\dot{z}_{damper}|_{\omega_{10}}$) in response to input vibrations at the frequencies of the x-axis. Plot 202 shows the normalized amplitude estimate calculation at 12.5 Hz ($|\dot{z}_{damper}|_{\omega_{12.5}}$) in response to input vibrations at the frequencies of the x-axis. Plot 203 shows the normalized amplitude estimate calculation at 15 Hz in response to input vibrations at the frequencies of the x-axis. Plot 204 shows the RFDA, the normalized sum of the amplitude estimate calculations at 10 Hz, 12.5 Hz, and 15 Hz, in response to input vibrations at the frequencies of the x-axis.

As mentioned above the when the normalized RFDA is greater than a threshold value, the control system implements a damping strategy to reduce the amplitudes of vibrations caused by vibrations at frequencies near the natural resonance frequency of the suspension. In the exemplary embodiment, the natural resonance frequency of the suspension is 12.5 Hz. The controller sends a signal to implement a damping control strategy when the RFDA is greater than or equal to about 0.7, in other words, when the resonating frequency of the suspension is from about 8.5 Hz to 17 Hz as shown in FIG. 4. Higher threshold levels can be utilized to detect narrower resonating frequency ranges.

In an alternate exemplary embodiment, a resonating frequency detection amplitude is determined using only one Fourier series estimate calculation at, for example, 12.5 Hz. The controller sends a signal to implement a damping control strategy when the resonating frequency detection amplitude is greater than or equal to about 0.8, in other words, when the resonating frequency of the suspension is from about 10 Hz to 14 Hz as shown in FIG. 4.

In other exemplary embodiments, the controller can calculate Fourier series estimate calculations at various other frequencies based on desired accuracy levels in desired frequency ranges. For example, Fourier series estimate calculations at 11 Hz, 13.5 Hz, and 16 Hz, provides higher resolutions between 11 Hz and 16 Hz frequencies. In other exemplary embodiments the controller can use Fourier series calculations for two frequencies or more than three frequencies to determine a resonating frequency detection amplitude.

Referring again to FIG. 2, at step 116, the controller implements a damping strategy to reduce the amplitudes of vibrations caused by vibrations at frequencies near the natural resonance frequency of the vehicle. In particular, the controller increases the damping level in of the suspension system, thereby providing compression and extension damping levels that will dampen vehicle vibrations within the resonating frequency range.

At step 118, the controller implements the standard damping strategy to reduce amplitudes of vibrations under standard conditions.

Figure 5:
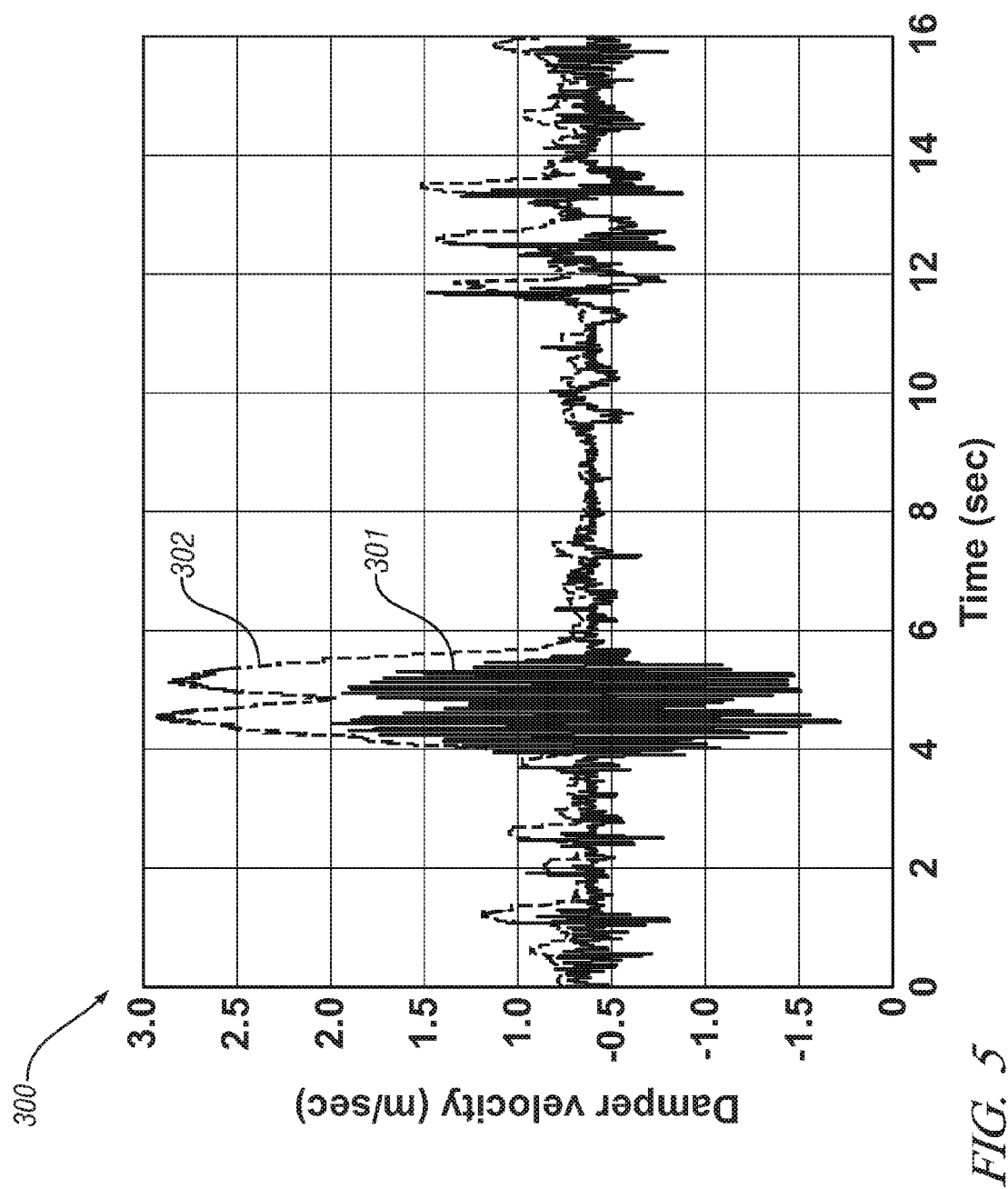
FIG. 5 is a graphical representation of an output value determined using the method of FIG. 2 and damper velocities versus time.

FIG. 5 shows results of an in-vehicle performance test utilizing the method 100 described above. The test involved a vehicle traveling at 50 mph on an actual road having typical rough road surface features. A graph 300 shows a data trace from the in-vehicle performance test. A plot 301 is a plot of damper velocity measurements determined from position measurements over time. A plot 302 is the RFDA level calculated by the controller in response to damper velocity level measurements of plot 301. Note, that in this test, the RFDA level was not normalized at one, but instead only the amplitude calculations at each of the three frequencies $$\left(|\dot{z}_{damper}|_{\omega_{10}}, |\dot{z}_{damper}|_{\omega_{12.5}}, |\dot{z}_{damper}|_{\omega_{15}}\right)$$

were normalized, then summed. As demonstrated by FIG. 5, the RFDA response is almost simultaneous with effects of the vibration on the vehicle. Further, the algorithm discriminates between chatter bumps, shown on the graph at an approximately two second interval between about 4 and 6 seconds and low frequency high amplitude road inputs shown on the graph at about 12, 12.5, and 13.5 seconds and therefore the RFDA threshold level is selected to discriminate between the chatter bumps and the high amplitude low frequency road inputs.

In the in-vehicle performance test, the damper force control was set to the minimum (zero current) when chatter bumps are detected. This control strategy minimized the transmission of wheel hop frequency to the chassis, thus improving road isolation. However, in actual operation, a feed-forward control could be implemented as soon as the RFDA reached a threshold thereby effectively addressing and reducing the chatter bump vibrations.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of detecting a vibration level of a wheel within a resonating frequency range of a vehicle suspension comprising:
   determining velocities of the wheel relative to a sprung mass of said vehicle;
   recording velocities over a selected time period;
   providing at least one periodic algorithm;
   determining an output value by utilizing the at least one periodic algorithm and the recorded velocities over the selected time period; and determining whether the vibration level of the wheel is within the resonating frequency range by utilizing the output value.

2. The method of claim 1, wherein providing at least one periodic algorithm comprises providing at least two periodic algorithms and wherein determining the output value by utilizing the periodic algorithm comprises determining the output value by utilizing the at least two periodic algorithms.

3. The method of claim 2, wherein at least one periodic algorithm has a frequency below a natural resonance frequency of the vehicle suspension and at least one periodic algorithm has a frequency above the natural resonance frequency of the vehicle suspension.

4. The method of claim 1, wherein providing at least one periodic algorithm comprises providing a Fourier series approximation algorithm and wherein determining the output value by utilizing the at least one periodic algorithm comprises determining the output value by utilizing a set of Fourier coefficients of the Fourier series approximation algorithm.

5. The method of claim 4, wherein the Fourier series approximation algorithm is:

$$\dot{z}_{damper} = a \sin(\omega t) + b \cos(\omega t),$$

wherein $\dot{z}_{damper}$ is the measured velocity of the wheel relative to the sprung mass of said vehicle cat a given time t;

a and b are Fourier coefficients, and $\omega$ is a selected frequency value.

6. The method of claim 5, wherein determining the output value comprises:

determining a solution of coefficient a by utilizing an integral $$a = \frac{2}{T} \int_{t_1}^{t_2} \dot{z}_{damper} \sin(\omega t) dt, \text{ and}$$

determining a solution of coefficient b by utilizing an integral $$b = \frac{2}{T} \int_{t_1}^{t_2} \dot{z}_{damper} \cos(\omega t) dt,$$

wherein $T = t2 - t1 =$ the selected time period.

7. The method of claim 6, wherein at least 100 velocities are determined over the selected time period.

8. The method of claim 6, wherein determining the output value comprises:

determining a solution of determined velocity amplitude $|\dot{z}_{damper}|_\omega = \sqrt{a^2 + b^2}$, wherein $|\dot{z}_{damper}|_\omega$ is the output value.

9. The method 8, further comprising:

determining whether the output value is above a predetermined threshold value indicative of a vibration level within the resonating frequency range; and selectively implementing a resonant damping control strategy when the output value is above the threshold value.

10. The method of claim 1, wherein providing at least one periodic algorithm comprises providing first, second and third Fourier series algorithms, wherein;

the first Fourier series algorithm is $\dot{z}_{damper} = a_{\omega_1} \sin(\omega_1 t) + b_{\omega_1} \cos(\omega_1 t),$ the second Fourier series algorithm is $\dot{z}_{damper} = a_{\omega_2} \sin(\omega_2 t) + b_{\omega_2} \cos(\omega_2 t),$ and the third Fourier series algorithm is $\dot{z}_{damper} = a_{\omega_3} \sin(\omega_3 t) + b_{\omega_3} \cos(\omega_3 t),$ wherein $\dot{z}_{damper}$ is the measured velocity level of the wheel relative to the sprung mass of said vehicle at a given time t, $\omega_1$ is a first selected frequency level, $\omega_2$ is a second selected frequency level, $\omega_3$ is a third selected frequency level, $a_{\omega_1}$ and $b_{\omega_1}$ are Fourier coefficients of the first Fourier series algorithm, $a_{\omega_2}$ and $b_{\omega_2}$ are Fourier coefficients of the second Fourier series algorithm, and $a_{\omega_3}$ and $b_{\omega_3}$ are Fourier coefficients of the third Fourier series algorithm.

11. The method of claim 10, further comprising:

determining solutions for Fourier coefficients $a_{\omega_1}$, $b_{\omega_1}$, $a_{\omega_2}$, $b_{\omega_2}$, $a_{\omega_3}$, and $b_{\omega_3}$ using summation approximations utilizing the recorded measured velocities over the selected time period; and determining the output value based on the solutions of $a_{\omega_1}$, $b_{\omega_1}$, $a_{\omega_2}$, $b_{\omega_2}$, $a_{\omega_3}$, and $b_{\omega_3}$.

12. The method of claim 11, wherein determining the output value based on the solutions of $a_{\omega_1}$, $b_{\omega_1}$, $a_{\omega_2}$, $b_{\omega_2}$, $a_{\omega_3}$, and $b_{\omega_3}$ comprises utilizing the equation:

$$|\dot{z}_{damper}| = \sqrt{(a_{\omega_1}^2 + b_{\omega_1}^2)} + \sqrt{(a_{\omega_2}^2 + b_{\omega_2}^2)} + \sqrt{(a_{\omega_3}^2 + b_{\omega_3}^2)},$$

wherein $|\dot{z}_{damper}|$ is the output value.

13. The method of claim 1, wherein determining the velocities of the wheel relative to the sprung mass of the vehicle comprises:

measuring a position of the wheel relative to the sprung mass of said vehicle at predetermined interval, and calculating the velocity of the wheel relative to the sprung mass of said vehicle based on at least two position measurements and an interval of time therebetween.

14. The method of claim 13, wherein position measurements are made using a deflection sensor.

15. The method of claim 1, wherein the resonating frequency range is between about 70% and 130% of a natural resonance frequency of the suspension.

16. The method of claim 1, wherein the selected time period is equal to a time period of between about 100 and 500 milliseconds.

17. The method of claim 1, wherein the selected time period is at least as long as two times a maximum wave period of a frequency within the resonating frequency range.

18. The method of claim 1, further comprising:

selectively implementing a resonant damping control strategy when the output value indicates that the vibration level of the wheel is within the resonating range.

19. A method of detecting a vibration level of a wheel within a resonating frequency range of a vehicle suspension comprising:

monitoring a velocity level of the wheel relative to a sprung vehicle component;

recording the monitored velocity levels over a selected time period at least as long as two times a maximum wave period of the resonating frequency range;

providing a Fourier series algorithm;

determining a value for each of two Fourier series coefficients by utilizing the Fourier series algorithm, the recorded monitored velocities, and a selected frequency level; and utilizing the values of the two Fourier series coefficients to detect whether the vibration level of the wheel is within the resonating frequency range.

20. A system of detecting a vibration level of a vehicle within a resonating frequency range of a vehicle suspension comprising:

a sensor configured to provide a signal indicative of position of a wheel relative to a sprung vehicle component;

a controller configured to receive the signals indicative of position of the wheel, utilize the signals to determine a set of velocity measurements, record the set of velocity measurements over a selected time period, and detect whether the vibration level of the wheel is within the resonating frequency range based on the recorded set of velocity measurements.

* * * * *